(12) United States Patent
Hublet et al.

(10) Patent No.: US 9,031,225 B2
(45) Date of Patent: May 12, 2015

(54) APPLICATION ADAPTED ACCESS DEVICE AND A METHOD TO ADAPT RESYNCHRONIZATION

(75) Inventors: Christian Hublet, Lochristi (BE); Frank Defoort, Kruibeke-Bazel (BE)

(73) Assignee: Alcatel Lucent, Boulogne-Billancourt (FR)

( * ) Notice: Subject to any disclaimer, the term of this patent is extended or adjusted under 35 U.S.C. 154(b) by 2133 days.

(21) Appl. No.: 11/744,202

(22) Filed: May 3, 2007

(65) Prior Publication Data

US 2007/0286397 A1    Dec. 13, 2007

(30) Foreign Application Priority Data

Jun. 9, 2006 (EP) .................................... 06300570

(51) Int. Cl.
*H04M 3/00*   (2006.01)
*H04L 5/14*   (2006.01)
*H04L 5/02*   (2006.01)

(52) U.S. Cl.
CPC ............... *H04L 5/1438* (2013.01); *H04L 5/023* (2013.01)

(58) Field of Classification Search
CPC . H04M 11/066; H04M 11/062; H04M 15/00; H04M 15/56; H04M 15/58; H04M 19/001; H04M 1/72502; H04M 1/72519; H04M 1/74; H04M 2215/0188; H04M 2215/202; H04M 2250/08; H04M 3/18; H04M 3/2272; H04M 3/561; H04M 3/568; H04M 3/2209; H04M 3/30; H04M 3/007; H04M 3/304; H04L 1/0025; H04L 1/007; H04L 47/10; H04L 43/0823; H04L 41/0803; H04L 12/26; H04L 43/0847; H04L 7/0008; Y02B 60/31; H04Q 2213/13039; H04Q 2213/13099; H04Q 2213/13199

USPC ............... 379/350, 399.01, 2, 14.01, 84, 154, 379/187, 197, 231, 234, 399.02; 370/216, 370/503, 507, 509, 242; 375/222, 224, 225, 375/226, 227, 228, 240.27, 240.28, 243
See application file for complete search history.

(56) References Cited

U.S. PATENT DOCUMENTS

| | | | |
|---|---|---|---|
| 6,161,203 A * | 12/2000 | Zuranski et al. ............... | 714/707 |
| 6,345,071 B1 * | 2/2002 | Hamdi .......................... | 375/222 |
| 6,587,502 B1 * | 7/2003 | Hendrichs et al. ............ | 375/222 |
| 7,317,754 B1 * | 1/2008 | Remy et al. ................... | 375/222 |
| 2002/0141563 A1 * | 10/2002 | Leyrer et al. ................. | 379/243 |
| 2003/0135544 A1 * | 7/2003 | Richardson ................... | 709/203 |
| 2004/0017802 A1 * | 1/2004 | Scholtz et al. ................ | 370/352 |
| 2005/0198312 A1 * | 9/2005 | Ashwood-Smith et al. .. | 709/228 |
| 2006/0291500 A1 * | 12/2006 | Kroninger et al. ............ | 370/465 |
| 2007/0140472 A1 * | 6/2007 | Chen et al. ............... | 379/392.01 |

FOREIGN PATENT DOCUMENTS

| EP | 0905948 A2 | 3/1999 |
|---|---|---|
| WO | WO 03/041353 A2 | 5/2003 |

* cited by examiner

*Primary Examiner* — Akelaw Teshale
(74) *Attorney, Agent, or Firm* — Harness, Dickey & Pierce

(57) ABSTRACT

The invention discloses a method to control a resynchronization trigger in an access device (40). A management station (43) is connected to the access CPE (40) via a control channel (50). The CPE is able to receive a control signal including application information and to calculate the synchronization trigger where the application information is used.

10 Claims, 4 Drawing Sheets

| Related Defect / Anomaly | Needed persistency to trigger re-start | |
|---|---|---|
| | Near-End | Far-End |
| (f)los | 5 ± 1 sec | 6 ± 1 sec |
| sef/rdi | 5 ± 1 sec | 6 ± 1 sec |
| (f)lom | 60 ± 1 sec | 60 ± 1 sec |
| (f)se | 10 ± 1 sec | 10 ± 1 sec |
| (f)ncd | 15 ± 1 sec | 17 ± 1 sec |
| (f)lcd | 15 ± 1 sec | 17 ± 1 sec |

FIG. 2

APPLICATION ADAPTED ACCESS DEVICE AND A METHOD TO ADAPT RESYNCHRONIZATION

The invention is based on a priority application EP 06 300 570.6 which is hereby incorporated by reference.

TECHNICAL FIELD

The present invention relates to a system, which provides access to a high-speed connection for multi media use. In particular, the present invention is directed to a modem using digital subscriber line (DSL) technology to facilitate the transfer of voice, data and video. Further more the invention is directed to a method to adapt the resynchronization behavior of an access device to the application supported over the high speed connection.

BACKGROUND OF THE INVENTION

To get the required bandwidth in a network is one important part of the performance, but there is another limitation in existing DSL systems which is the DSL modem according the standard. A DSL system includes devices in a Central Office and a device at subscriber location, named CPE Customer premises equipment.

A DSL system is per definition in one of the following service states:
a) "Down" which means to be out of service
b) Busy by Synchronizing, which means a sequence of actions at both the central office CO modem and at the end-customer modem CPE in order to obtain an operational DSL communication channel. Those actions include clock synchronization, tuning equalizers to received test signals, measuring channel characteristics, exchanging configuration parameters, and exchanging operational parameters. Such synchronization for DSL systems typically takes at least 10 seconds.
c) Busy with Data transfer (also called show time in DSL), which means, that interconnected DSL modems at CO and CPE are in user data exchanging mode, transporting data for all types of services (e.g. internet data, voice, video, gaming, . . . ) The quality of the data transfer is continuously measured.

Although DSL is using a fixed wiring (a twisted pair) as transportation medium, the quality of a DSL system is varying in time due to the nature of that twisted pair:
  the balance of a twisted pair is never perfect, what makes that it is vulnerable to egress of own transported signal, and ingress of external signals. Such external signal can be radiation from electro equipment, often felt as an impulsive boost of ingressed signal, corrupting the DSL signals for a while.
  Cross talked signals from other DSL systems in same cable binder will due to imperfect cable balance be taken up, and increase the noise signal on cost of the wanted signal. The strength and frequency content of such crosstalk signal is varying in time (e.g. in relation to on/off switching of CPE's on other pairs in same cables).
  The temperature and humidity of a twisted pair do change its characteristics, making the transportation medium characteristics varying in time.
  The twisted pair link between a CO and a CPE contains of multiple segment, connected through splices or connectors. Those connections are subject to changing characteristics due to aging or environmental condition (tension, temperature, humidity, . . . )

When measured DSL signal quality at one of the DSL modems drops below a predefined threshold, that DSL modem can decide for an autonomeous resynchronisation (or also called retrain) in order to redo the initialization process to get better tuned to the changed environment, with a better quality The resulting effects of all the distortion described are bit errors, and not corrected bit errors on the DSL line will lead to packet loss on the layers above the DSL physical layer (e.g. ATM packets, Ethernet packets, IP packets, MPEG packets, . . . )

For some applications, the underlying layers or the application layer itself can cope with lost packets as long as the packet loss rate is within reasonable bounds.

These higher layer techniques could be based on retransmission (TCP, reliable UDP, . . . ) or forward error correction techniques. These are basically error mitigation techniques: the effect of packet loss is hidden at the expense of an increased complexity and lost bandwidth. An example of such is the Microsoft IPTV system.

Another technique to cope with lost packets is based on concealment. For instance when part of a video frame is lost, it can be replaced by previous frame, and end-user will hardly notice the error.

As indicated certain severe or persistent error conditions on the DSL line will also lead to triggering an autonomous resynchronisation process.

Resynchronisation of the medium will block the data traffic in the case of DSL even for multiple tens of seconds (typically 10-60 seconds). Higher layers cannot always cope with service outage of that order. In case of High Speed Internet, the end-user will only experience a temporarily slow Internet. However, in case of video applications this results in visible artifacts on the screen such as a frozen screen or no video for multiple seconds. Voice services suffer as well from an unacceptable service loss, and for gamers such interruption can make the difference between dead or alive.

The conclusion is that some applications can allow a significant higher packet loss rate than other applications. Difference is on the supported or underlying error mitigation and concealment techniques. Some applications can withstand a short traffic interruption, e.g. Microsoft IPTV can accept a traffic loss of few seconds due to its retransmission system based on a very large buffer and some applications can accept a long traffic interruption, typically non real-time applications as e.g. Internet data for web surfing.

Today DSL systems have autonomous retrain thresholds at both CO and CPE side. The DSL standards oblige to have at least a retrain trigger implemented when the near-end received signal gets lost (loss-of-frame [lof] or loss-of-signal [los]) during 5 consecutive seconds. FIG. 1 shows the state diagram of a DSL modem according ITU G992.1 Annex D page 193/194. States are here indicated by ovals with the name of the state given within the oval. The states are defined for the DSL modem. Arrows indicate transitions between the states with the event causing the transmission listed next to the arrow. For some events the source of the event is indicated with letters and a colon proceeding the event name. A key to the source is provided at the bottom of the FIG. 1.

According to the standard, in case of persistent (5±1) Loss Of Signal (LOS) or Loss Of Failure (LOF) defect, the DSL modems shall restart the initialization sequence with or without self-test.

Most CO and CPE implementations have supplementary retrain triggers besides those one based on the persistent LOS or LOF. Moreover, resynch triggers are not only based on the near-end signal, but can also be based on the reported far-end signal quality.

A resynch trigger is typically expressed as: reset the modem in case of persistently detecting defect <d> during a consecutive time of <s> seconds.

FIG. 2 is an example of resynch triggers as implemented in Alcatels Multi-DSL CO modems, the abbreviation stand for:
los (loss of signal)
flos (far-end loss of signal)
sef (severely errored frame)
rdi (remote defect indication)
lom (loss of margin)
ses (severely errorred second)
ncd (no cell delineation)
lcd (loss of cell delineation)

The triggers to resynchronise the line are typically:
A loss of synchronisation of the two modems resulting in no data transfer at all. In this case the resynchronisation can probably not be avoided.
Number of consecutive error seconds.

If the communication medium is used to its limits (e.g. long DSL loops, high required bandwidth in a very noisy environment with e.g. repetitive impulsive noise), it is very likely to happen that a high number of bit errors are observed every second during multiple consecutive seconds. As long as these errors can be corrected at a reasonable cost on application level, there is no need to resynchronise the line.

For business access (data, voice), a high number of consecutive error seconds can justify a resynchronisation. For a real time video application with error concealment, this might be not required.

In prior art the triggers to retrain the DSL line are hard coded in the DSL CO and CPE modems as in FIG. 2. As a result, the triggers cannot be adapted to the envisaged application. The communication could be unnecessary blocked for tens of seconds.

SUMMARY OF THE INVENTION

The invention is overcoming the blocking point of a fixed and non-adaptable trigger for resynchronization in the access devices as a DSL modem located at CO or at the user side applying the function according claim 1. The key point in the invention is that the policy to decide for a resync is configurable so that it can be adapted to the application. The policy can take into account application related information obtained via a single communication channel or via multiple communication channels.

The invention proposes a method to calculate the resynch trigger using the information about the application that runs or will run.

The invention has the advantage that the configuration of the access devices e.g. a DSL modem located at CO or at the user side can be adapted and flexible handled according the needs of the communication channel.

BRIEF DESCRIPTION OF THE DRAWINGS

Further advantages are described in the dependent claims.
The advantages of the inventions are describes in the figures as:
FIG. 2: Table of defects triggering a resynch

SHORT DESCRIPTION OF PREFERRED EMBODIMENTS

The invention has the intention to configure an access device, at the end user side and/or the network side according the application, which should run. Applications are therefore defined in several levels of data signal quality requests as for example a high level quality for IP-TV application (level1), a lower level for a business application (level2) etc.

The levels defined for the application either include the maximum allowed link quality degradation before a resynch should occur, or information on how long the link must be maintained without a retrain event when the transmission fails or a time schedule when the next retrain sequence will be allowed.

In the following description the CPE is used without limitation for a subscriber DSL modem, but a CPE can also be a set-top box or an in-house gateway.

Figure 1:
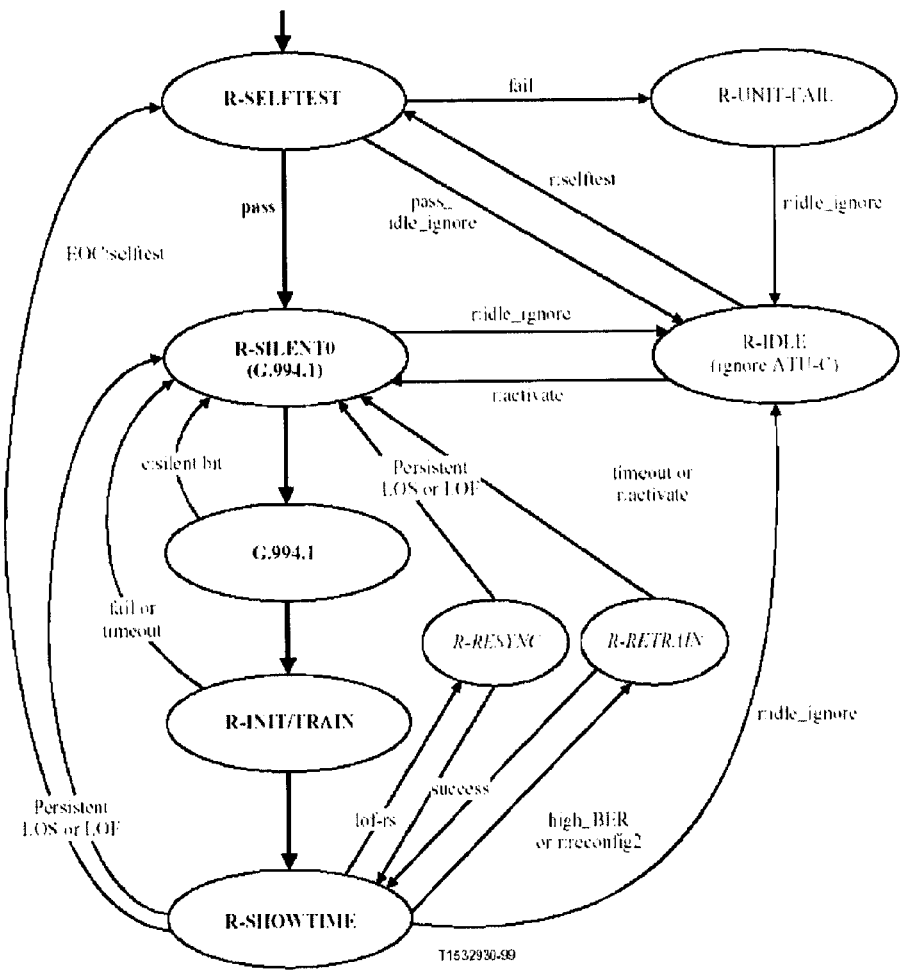
FIG. 1: state diagram of a DSL modem
Figure 3:
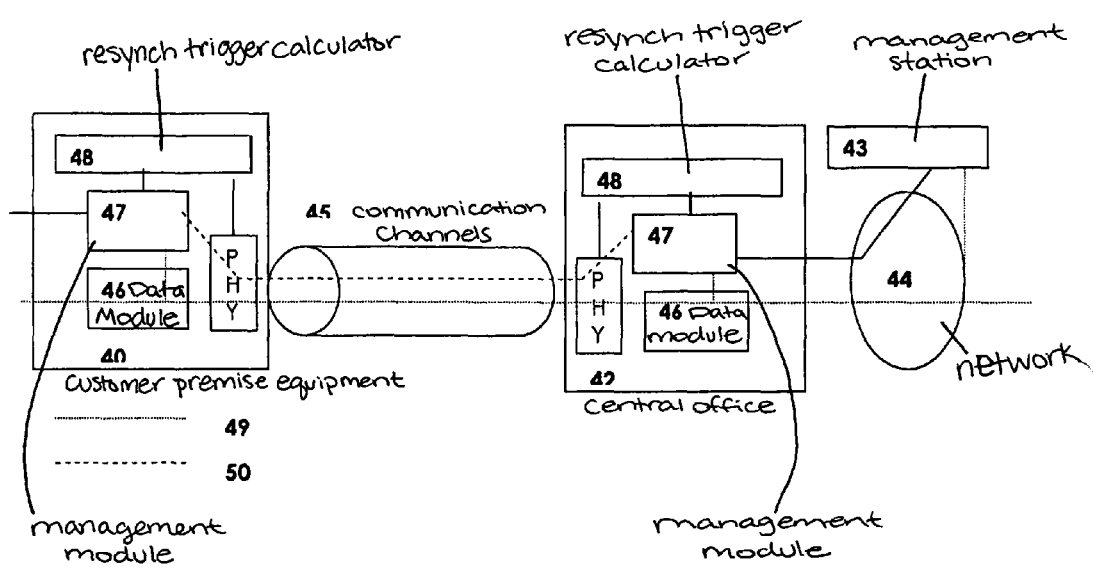
FIG. 3: Embodiment of the invention

FIG. 3 shows one embodiment of the solution: A remote CPE 40 is connected to Central Office 42 via communication channels 45. In the CPE 40 and the central office equipment 42 the physical layer module PHY realizes the connection in between. The CPE 40 and the central office equipment 42 contain a data module 46 connected with a management module 47. The data module 46 has an additional connection to the communication channel 45 and specially to the data channel 49. The management module 47 is linked to an internal resynch trigger calculator 48.

The management module is in addition linked to the management station 43, which controls the network 44.

The management modules 47 are connected via a signaling channel 50 with each others and finally with the management station 43.

When the communication starts the physical laxer module PHY takes care of starting up and maintaining the communication on the communication channel. It receives its configuration from the management module 47 and reports status and events to the management module 47 and resync trigger calculator 48.

The management module 47 takes care of all network management issues as fault management, configuration management, performance and security management for the communication channel 45 and the system.

The resync trigger calculator receives its configuration (resync policy) from the management module 47. Based on this policy information and the status of the link, it triggers the PHY to execute a resync.

The modules as described can be realized as separate modules or as a common module using one or several processors.

During the configuration of the DSL communication line, the resync triggers for Central Office equipment 42 and CPE 40 are configured in line with the general targeted service. The management station 43 controls the parameters set for the specific use according the required application.

This service can be the content of a contract with the end-user for a IP TV connection. The Central Office equipment 42 passes the signaling of configuration to the CPE modem 40 during initialization. The Central Office equipment 42 and the remote CPE 40 receive configuration signaling according application during show time. Via the physical layer module PHY the management module 47 receives the signaling and transfer the information to the Resynch trigger calculator 48.

As a result the criteria for starting a resynchronization are relaxed or strengthened depending on the application. The signaling to adapt the Resynch function is in one embodiment transferred using the embedded operation channel EOC that is used to transfer information about in service and out of service maintenance and to retrieve status information and performance monitoring. This solution is an in-band solution.

Another possibility is to provide the signalling out of band by multiplexing the signalling in the management information stream with data information streams. Another possibility is to use the management interface of central office to transfer the signalling to the remote CPE 40.

The necessary link status information (LOF, LOS, error seconds, ...) is retrieved by the remote CPE 40 and the central office equipment 42. This information is used in the resync trigger calculator 48 that has control over the resync process.

There is a freedom to use the link status information to adapt the devices. The invention can be realized without use of the link status information and with the use of link status information. Solution using link status information improves the robustness of the invention.

Another embodiment of the invention is a solution, which allows the modem to amend in an autonomous way. Again the necessary link status information (LOF, LOS, errored seconds, etc.) is retrieved by the remote CPE 40 and the central office equipment 42.

In the resynch trigger module the information is evaluated. In addition the application level is taken into account and the resynch trigger calculator calculates autonomous the resynch event.

The management station 43 implements adaptable near-end and far-end resynch triggers to handle the communication between all remote CPE and near end equipment.

To get the full information about network management station 43 must steer those adaptable triggers at the central office depending on the running applications at that time on that line, or related to contract of that end-user.

Another embodiment of the invention is not explicitly described in a figure. Herein the management station 43 is not positioned in the network but in the end user device. This end user device can be an in-house gateway or set-top-box STB. This alternative devices are available in a subscriber environment and are used to access networks according the quality requested for an application.

Figure 4:
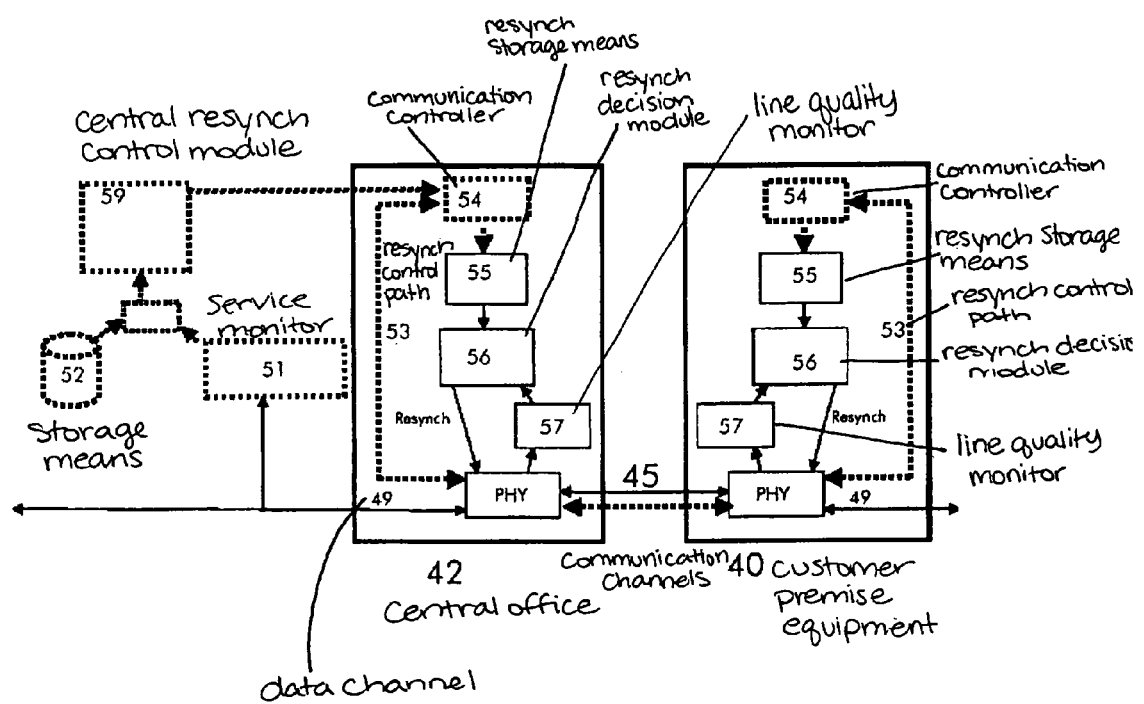
FIG. 4: second embodiment of the invention

Another more detailed embodiment is described in FIG. 4. All connection and parts, which are different from prior art are shown in dashed lines.

A remote CPE 40 is connected to Central Office 42 via communication channels 45. In the CPE 40 and the central office equipment 42 the physical layer module PHY realizes the connection in between. The CPE 40 and the central office equipment 42 contain a line quality monitor 57, a local resynchronization decision module 56, a resynch conditions storage mean 55 and a communication controller 54. The communication controller 54 is connected via a resynch control path 53 with the physical layer PHY. The communication controllers are linked to a central management station 43 including a central resynch control module 59, a storage mean 52 and a service monitor 51.

The central management station stores knowledge on to be supported services for the actual line e.g. end-user contracts about offered applications including used underlying error mitigation/concealment methods. This information is used either with the information extracted from the service monitor 51 or alternative to the information of the service monitor. The service monitor extracts running applications and their applied error mitigation and concealments techniques from the line. The information of both sources is basis for the central resynch control module 59 to generate an information signal for the access devices CO equipment 42 and CPE 40 to control resynchronization.

In the CPE 40 the information is received by the PHY and transferred to the communication controller 54. The information is forwarded to the resynch condition storage mean 55 and to the local resynch decision module 56 which generate the resynch event according the information received from the central management.

The invention is not limited to the embodiments described. Any possible solution an expert can apply can be used to realize the adoption process in an access device. So the parts described in the embodiment, as calculators of controller can be one module or several modules and realized either in hard- or in software.

The invention claimed is:

1. A method to control resynchronization decision process in a pair of devices including a central office and remote station connected to a management station, the management station including modules for receiving, sending and calculating signals, the central office and remote station being interconnected by a physical layer module, the method comprising:
configuring, by a management module, a policy to trigger the physical layer module to execute a resynchronization taking into account application information, and the configuring includes,
receiving a control signal related to the application information, and
calculating a resynch trigger using the control signal related to the application information.

2. The method according claim 1, further comprising:
receiving the control signal in a data channel.

3. The method according claim 1, further comprising:
receiving the control signal in an embedded operation channel.

4. The method according claim 1, further comprising:
receiving the control signal during a link initialization process.

5. The method according claim 1, further comprising:
selecting, using the control signal, predefined rules in relation with the application informed stored in a resynch trigger calculator.

6. A customer premise equipment providing high speed network connectivity comprising:
a management module configured to,
communicate management information with a management station, and
communicate control signals and the management information to a central office equipment, and the communicating the control signals includes receiving a control signal related to application information; and
a resynch trigger calculator connected to the communication channel via a physical layer module, the resynch trigger calculator is configured to,
receive a resynch policy from the management module, and
trigger the physical layer module to execute a resync based on the received resynch policy,
the resynch policy determines whether a resync is configurable taking into account the application information that is received at the management module via the physical layer module, and the resync policy includes a resynch trigger that is calculated using the control signal related to the application information, and
the resynch policy is transferred from the management module to the resynch trigger calculator.

7. The customer premise equipment of claim 6, wherein the application information is based on the type of data communicated to the central office.

8. The access equipment of claim 6, wherein the application information is based on the type of data communicated to the end-user equipment.

9. An access equipment in a central office for providing high speed network connectivity comprising:
   a management module configured to,
      communicate management information with a management station, and
      communicate control signals and the management information to an end-user equipment, and the communicating the control signals includes receiving a control signal related to application information; and
   a resynch trigger calculator connected to a communication channel via a physical layer module, the resynch trigger calculator is configured to,
      receive a resynch policy information from the management module, and
      trigger the physical layer module to execute a resync based on the resynch policy information,
   the resynch policy information determines whether a resync is configurable taking into account the application information that is received at the management module via the physical layer module, and the resync policy includes a resynch trigger that is calculated using the control signal related to the application information, and
   the resynch policy information is transferred from the management module to the resynch trigger calculator.

10. The method of claim 1, wherein the application information is based on the type data communicated from the central office with the remote station.

* * * * *